No. 812,738. PATENTED FEB. 13, 1906.
J. A. HARDEN.
COTTON CHOPPING MACHINE.
APPLICATION FILED NOV. 15, 1905.
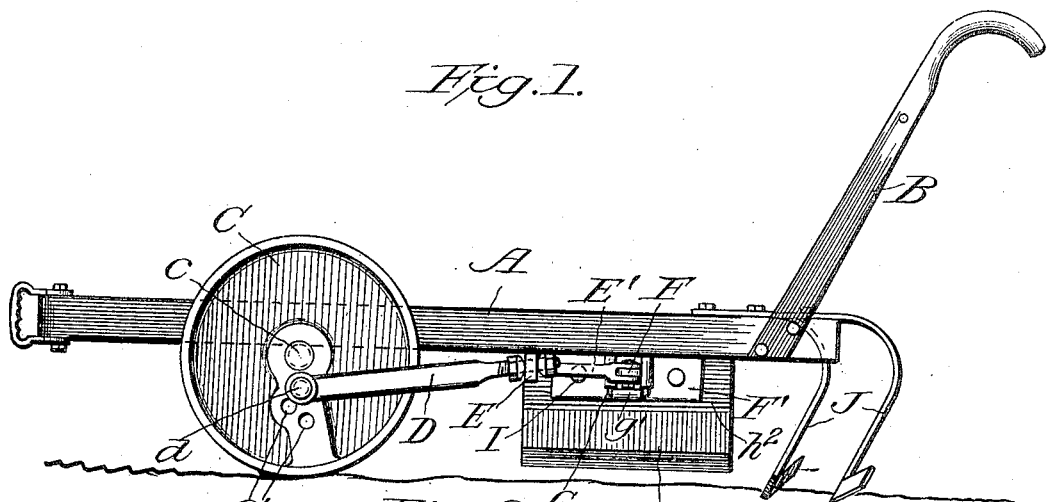
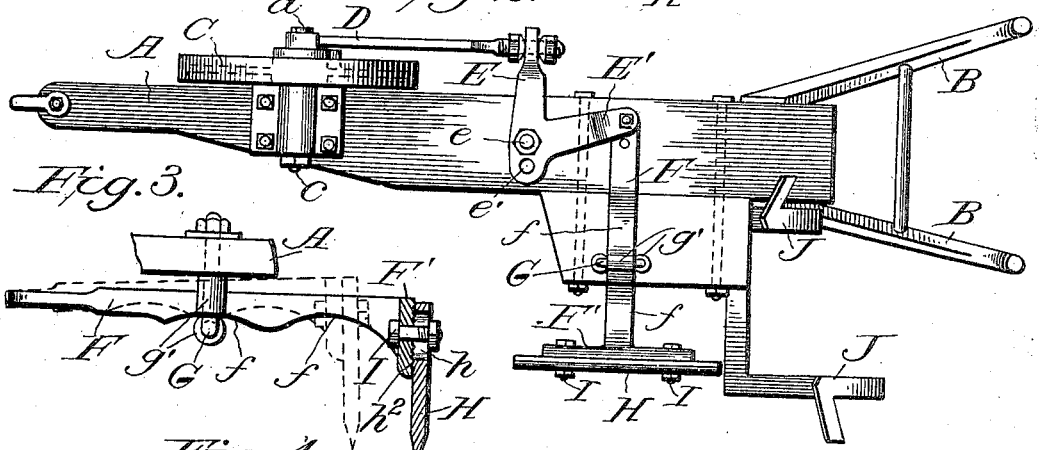
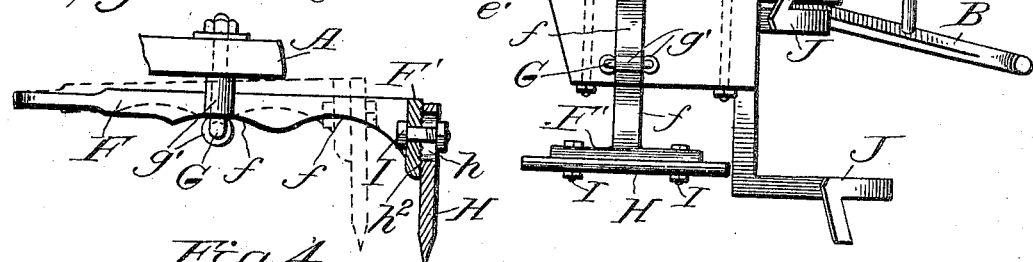
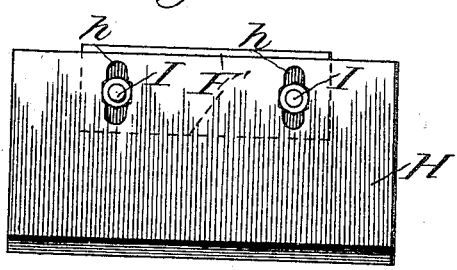
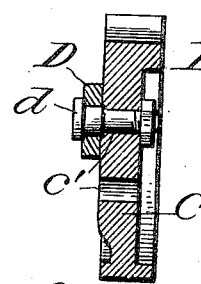
Inventor
James A. Harden.

UNITED STATES PATENT OFFICE.

JAMES ALLEN HARDEN, OF ANDALUSIA, ALABAMA.

COTTON-CHOPPING MACHINE.

No. 812,738.  Specification of Letters Patent.  Patented Feb. 13, 1906.

Application filed November 15, 1905. Serial No. 287,510.

*To all whom it may concern:*

Be it known that I, JAMES ALLEN HARDEN, of Andalusia, in the county of Covington and State of Alabama, have invented certain new and useful Improvements in Cotton-Chopping Machines; and I hereby declare that the following is a full, clear, and exact description thereof, reference being had to the accompanying drawings, which form part of this specification.

This invention is an improved machine for chopping cotton and other drilled growths to thin out the plants while they are young and tender. Its object is to provide a machine which will be effective in operation, can be easily managed by one man and a horse like a single plow or cultivator, can be adjusted so as to cut or hoe hills any desired distance apart according to the nature of the soil, can be easily repaired if broken or damaged at little expense, and can be handled as easily as an ordinary shovel-plow.

The invention therefore consists in the novel construction and combination of parts hereinafter described and claimed, and the accompanying drawings, forming part of this specification, will enable any one to readily comprehend the substance of the invention and how to make and use it.

In said drawings, Figure 1 is a side elevation of the chopper complete. Fig. 2 is a bottom plan view thereof. Fig. 3 is a transverse sectional view, and Figs. 4 and 5 are details.

The machine somewhat resembles an ordinary cultivator, having a beam A, provided with controlling handles B B at its rear end and supported on a wheel or disk C, mounted on a stub-shaft or axle $c$, securely fastened to the forward part of the beam, so that the wheel rotates in a plane parallel with the longitudinal axis of the beam. To this wheel is connected the forward end of a connecting-rod D, preferably by means of a wrist-pin bolt $d$, removably secured in a hole $c'$ in the web of wheel C. A plurality of holes $c'$ are preferably formed in the wheel at different distances from the center thereof, so that the throw of the connecting-rod D can be changed by securing the wrist-pin $d$ in different holes $c'$.

The rod D is pivotally connected at its rear end to one arm E of a bell-crank lever, which is pivoted at its bend on a bolt $e$, secured to the under side of the beam A. This bell-crank lever may be provided with two or more pivot-holes $e'$, with any one of which bolt $e$ may be engaged, so as to vary the throw of the other arm E' of the lever, which arm E' is pivotally or loosely connected to the inner end of a transversely-disposed reciprocatory bar F, which projects on the side of the beam opposite the wheel and carries a chopping hoe or blade H.

The bar F is slidably guided in a hanger G, attached to a lateral extension or projection $a$ of the beam A, as shown, the construction being such that the rotary movements of the wheel C cause reciprocatory movements of the bar F and attached hoe, the hoe moving transversely of the beam and substantially at right angles to the line of movement of the machine. The hanger G may be provided with rollers $g'$ to lessen friction of the bar F thereagainst. Said bar is also preferably formed with oppositely-inclined surfaces $f f$, that bear upon the supporting portion of the hanger, so that as the bar is reciprocated the hoe is caused to rise and fall, it being lowest in its two outermost positions and highest at center of its travel, which motions cause the hoe to substantially hill the row simultaneously with its cutting thereof or to accommodate itself to the swell of the row.

The hoe H is preferably removably attached to the hoe-bar F, so that hoes of any desired size can be attached thereto.

A convenient means of removably attaching the hoes is illustrated in the drawings, in which the bar F is shown as having a large transverse T-head F', provided with openings $f'$ for the passage of securing-bolts I, which transfix slots $h$ in the hoe H and adjustably and removably fasten the hoe to the bar. If desired, the opposed surfaces of the hoe and head F' could be provided with interlocking serrations, as shown at $h^2$, so that the hoe cannot be vertically displaced after the bolts I are tightened. By providing a set of interchangeable hoes the machine can be readily adapted to cut hills of any desired size and depth. The size of the hills and the length of stroke of the hoe can be also regulated by varying the connection of rod D to wheel C and of lever E to the beam.

The machine is driven along a row of cotton or other vegetation to be chopped or hilled, the horse and operator walking between the rows, while the hoe moves back and forth across the adjacent row, cutting it with a drawing motion on one stroke and by a pushing motion on the other stroke. As a resultant of the transverse reciprocatory movements and the longitudinal progressive movement the hoe describes an undulatory path in traversing the row, and if the parts are properly proportioned the hoe will cut the row at suitable intervals, leaving stalks in hills properly spaced apart as is required and desired.

In order to clear out any weeds growing between the rows, I provide the machine with several spring cultivator-teeth J J, attached to the beam or a lateral projection thereof, so as to operate on the side of the row which is being hoed and in the furrow traversed by the wheel C, to enable the machine to make a clean properly-finished piece of work.

With long hoes wider spaces will be cut in the row and narrower hills be left. With short hoes the spaces will be shorter and the hills longer. The hoe, owing to its double motion, crosses the row at an angle or obliquely and gradually rises as it approaches the plants and descends as it recedes therefrom, thus cutting about the same depth all the time. If the operator wishes to get the hoe out of the ground or over an obstruction at any time, he has merely to lift the beam by the handles or tilt it to the side opposite the hoe, so as to raise the latter clear of the ground.

I have illustrated the beam and extension as if made of wood; but of course the invention is not restricted to a wooden beam or frame, as that may be of any desired material and form suitable to support and carry the working parts in operative relation.

Having described my invention, what I claim as new, and desire to secure by Letters Patent, is—

1. In a cotton-chopping machine, the combination of the beam, its supporting-wheel, a longitudinally-reciprocating bar arranged transversely of and projecting to one side of the beam, a hoe attached to said bar, and means for actuating said bar by and from said wheel, substantially as described.

2. In a cotton-chopping machine, the combination of the beam, the supporting-wheel, a longitudinally-reciprocating bar arranged transversely of and projecting to one side of the beam, a hoe attached to the outer end of the bar, and a bell-crank lever and connecting-rod for actuating said bar from said wheel, substantially as described.

3. In a cotton-chopper, the combination of a wheel, a transversely-arranged longitudinally-reciprocating bar supported in rear of the wheel and projecting to one side of the beam, a bell-crank lever connected to said bar, and a rod connecting said lever with the wheel, a guide for said bar, and a hoe attached to the outer end of said bar, substantially as described.

4. In a cotton-chopper, the combination of a beam, a tracking-wheel, a longitudinally-reciprocating bar supported in rear of the wheel and lying transversely of the beam, a bell-crank lever connected to said bar, and a rod connected to said lever and having an adjustable connection to the wheel, a guide for said bar, and a hoe attached to the outer end of said bar, substantially as described.

5. In a cotton-chopper, the combination of the beam, a wheel attached to the forward part thereof, a transversely-arranged longitudinally-reciprocating hoe-carrying bar attached to the beam in rear of the wheel, a bell-crank lever pivoted to the beam and having one arm pivotally connected with said bar, a connecting-rod connected to the wheel and to the bell-crank lever, and a hoe removably attached to the outer end of said bar, substantially as described.

6. In a cotton-chopper, the combination of the beam, a wheel on the forward part thereof, a transversely-arranged longitudinally-reciprocating bar attached to the beam in rear of the wheel, a guide for said bar, a bell-crank lever pivoted to the beam, and having one arm pivotally connected with said bar, a rod connected to an adjustable wrist-pin on the wheel, and pivotally connected to the bell-crank lever, and a hoe attached to the outer end of said bar, substantially as described.

7. In a cotton-chopper, the combination of a longitudinally-reciprocating hoe-bar, means for reciprocating the bar, and means for causing the rising and falling of the hoe as the bar reciprocates, substantially as described.

8. In a cotton-chopper, the combination of the beam, a reciprocating hoe-bar, a hoe thereon, means for reciprocating the bar longitudinally, and means for causing the rising and falling of the hoe end of bar as it reciprocates, substantially as described.

9. In a cotton-chopper, the combination of a wheel, a transversely-arranged hoe-bar, projecting to one side of the wheel and having a double-inclined bearing portion, a guide for the bar engaging said bearing portion, a hoe attached to the outer end of said bar, and means for actuating the bar from the wheel, substantially as described.

10. In a cotton-chopper, the combination of a beam, a wheel thereon, a reciprocating bar projecting to one side of the wheel and having a double-inclined bearing portion, a guide for the bar engaging said guide bearing portion whereby the bar is caused to rise and fall as it reciprocates, a hoe attached to the outer end of said bar, and a lever and connecting-rod for actuating the bar from the wheel, substantially as described.

11. In a cotton-chopper, the combination of the beam, the wheel supporting the forward end thereof, a reciprocating bar arranged transversely of the beam and a guide for the beam, a hoe attached to the outer end of said beam; means for reciprocating said bar longitudinally, and means for causing a rising-and-falling movement of the hoe as it is reciprocated, substantially as described.

12. In a cotton-chopper, the combination of the beam, the handles at rear end thereof, the wheel supporting the forward end thereof, a reciprocating bar arranged transversely of the beam and projecting to one side thereof, a guide for the beam, a hoe detachably attached to the outer end of said beam, a bell-crank lever and connecting-rod for reciprocating said bar, and means for causing a rising-and-falling movement of the hoe as it is reciprocated, substantially as described.

13. In a cotton-chopper, the combination of the wheel, a transversely-arranged reciprocating bar in rear of the wheel projecting to one side, a guide for said bar, means to cause a rising-and-falling motion of the bar as it reciprocates, a bell-crank lever connected with said bar, a rod pivoted to said bell-crank lever and connected to the wheel, and spring-teeth in rear of the hoe, substantially as described.

14. In a cotton-chopper, the combination of the beam, a wheel supporting the forward end thereof, a transversely-arranged reciprocating bar in rear of the wheel projecting to one side of the beam, a guide for said bar; means to cause a rising-and-falling motion of the bar as it reciprocates, a bell-crank lever connected with said bar, a rod pivoted to said bell-crank lever and connected to an adjustable wrist-pin on the wheel, handles for the rear end of the beam, and spring-teeth attached to the beam in rear of the hoe, substantially as described.

In testimony that I claim the foregoing as my own I affix my signature in presence of two witnesses.

JAMES ALLEN HARDEN.

In presence of—
  W. H. JONES,
  G. W. LITTLE.